Dec. 20, 1949 N. T. ALMQUIST 2,492,084
COUNTERBALANCE MEANS FOR OVEN DOORS
Filed July 4, 1945 2 Sheets-Sheet 1

Inventor
NILS T. ALMQUIST
By Lindsey and Robillard
Attorney

Dec. 20, 1949 N. T. ALMQUIST 2,492,084
COUNTERBALANCE MEANS FOR OVEN DOORS
Filed July 4, 1945 2 Sheets-Sheet 2

Inventor
NILS T. ALMQUIST
By Lindsey and Robillard
Attorney

Patented Dec. 20, 1949

2,492,084

UNITED STATES PATENT OFFICE 2,492,084

COUNTERBALANCE MEANS FOR OVEN DOORS

Nils T. Almquist, New Britain, Conn., assignor to Landers, Frary & Clark, New Britain, Conn., a corporation of Connecticut Application July 4, 1945, Serial No. 603,227

5 Claims. (Cl. 126—191)

1

This invention relates to oven doors of the so-called drop type which are hinged at their lower edge for swinging movement from a vertical closed position to a horizontal open position, and the invention has particular reference to means for counterbalancing a door of this type.

The aim of the invention is to provide an improved counterbalancing means which will permit the door to be opened and closed in an unusually smooth manner and with slight effort.

A further aim of the invention is to provide an improved counterbalancing arrangement which is characterized by its simplicity in construction, its economy in manufacture, the ease and facility with which it may be assembled and installed in place between the walls of the oven, and by its durability.

A still further aim of the invention is to provide an improved counterbalancing arrangement wherein the counterbalancing means may be mounted within the space between the casing and lining of the oven, without increasing the size thereof.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Referring to the present illustrative drawings wherein is shown one embodiment which the present invention may take:

Figure 1:
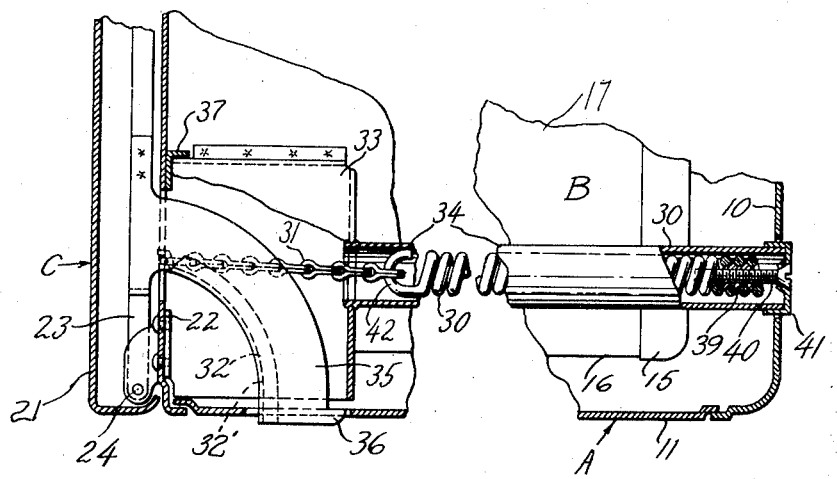
Figure 1 is a sectional view through the oven with the door closed, this view being taken substantially on line 1—1 of Fig. 3.

Referring to the drawings in detail, there is shown, for illustrative purposes, a portable roaster oven having an outside shell A provided with a back wall 10, a bottom wall 11, side walls 12, and a front wall or frame 13. Within the outer shell is an inner shell or lining B having a rear wall 15, a bottom wall 16, and side walls 17, the lining, as usual, being open at its front end. The

Figure 2:
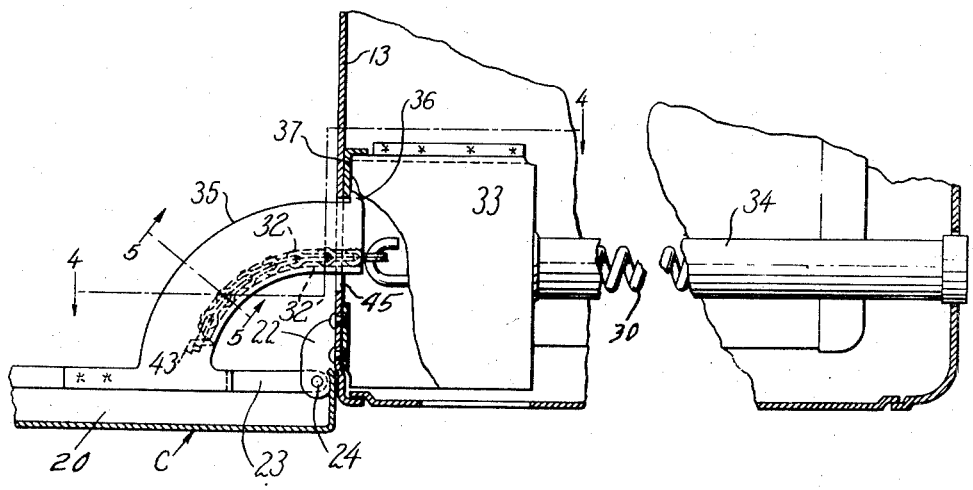
Fig. 2 is a view similar to Fig. 1 but showing the door in open or dropped position.
Figure 5:
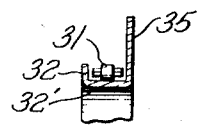
Fig. 5 is a cross sectional view taken along the line 5—5 of Fig. 2.
Figure 3:
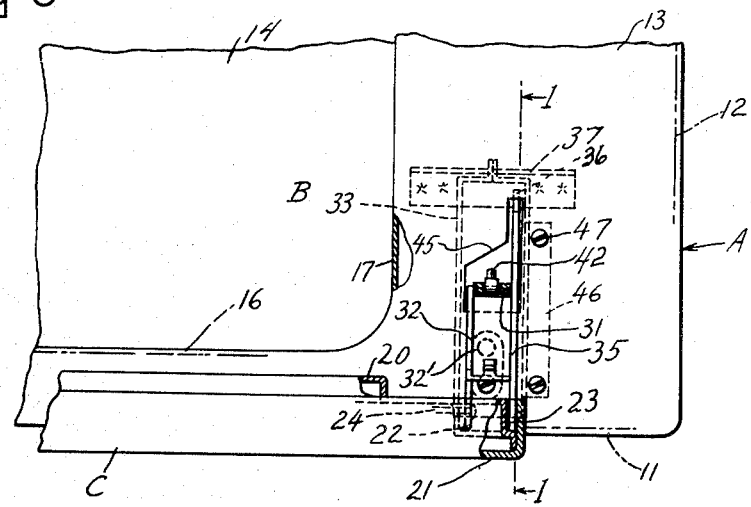
Fig. 3 is a front view of a portion of the oven with the door in lowered position, the chain being shown in section.
Figure 4:
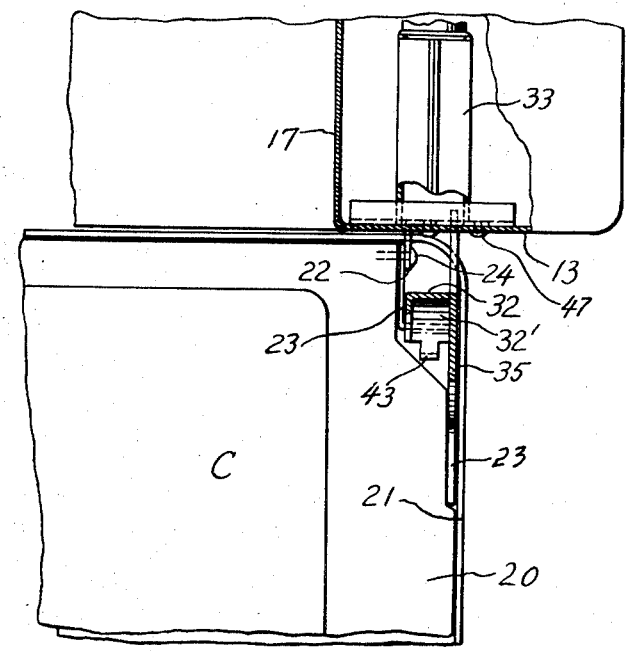
Fig. 4 is a horizontal sectional view taken substantially on line 4—4 of Fig. 2, the chain being omitted.

2 space between the walls of the two shells is adapted to receive, as is usual, a suitable insulating material, the same not being shown. The oven is further provided with a door C which is hinged at its lower edge to the front wall or frame of the outer shell so that it may be swung from the closed vertical position shown in Fig. 1 to the horizontal open position shown in Fig. 2. The door may be of any suitable construction but it is shown as having a sheet metal lining 20 and a panel 21, there being interposed between the lining and the panel the usual insulating material, not shown. The right-hand hinge for the oven door is shown in the drawings, it being understood that there will also be a hinge at the left-hand end of the door. The hinge shown comprises a bracket 22 connected to the front frame of the oven, a hinge member 23 in the form of an offset strip secured, as by spot welding, to the lining of the door, and a pintle or pivot pin 24. As used herein, the term "side edges of the door" refers to the vertical edges of the door when the door is in closed position.

Referring now to the improved counterbalancing arrangement forming the subject matter of the present invention, the same comprises generally a horizontally disposed tension spring 30 adjustably anchored at its rear end and connected at its forward end by means of a flexible connecting member, such as a chain 31, to the forward end of an arcuate guide 32, which is curved generally about the door pivot 24 as a center. In order to prevent the insulating material between the walls of the outer and inner shells from interfering with the operation of the counterbalancing means, the latter is enclosed, the enclosure being in the form of a box 33 secured to the front wall 13 of the outer shell, and a tube 34 secured at its forward end to the rear wall of the box 33 and extending rearwardly to the rear wall 10 of the outer casing. These parts are positioned in the space provided between the adjacent side walls of the two shells.

In the present illustrative disclosure, the guide 32 is carried by a curved arm 35 formed integrally with the hinge member 23. The guide 32 has a channel or groove in its outer surface, the bottom 32' of which is curved about the axis about which the door is swung, and onto this surface the flexible connecting member or chain 31 is progressively laid when the door is swung from the closed position shown in Fig. 1 to the open position shown in Fig. 2. The arm 35, on its free end, has an outwardly extending tooth 36 which constitutes a stop adapted to engage against a stop member 37 which is in the form of a transversely extending angle iron secured against the rear surface of the front panel 13 of the oven. The spring 30 is horizontally disposed and its length extends tangentially to the curved surface 32' of the guide.

The rear end of the spring is adjustably connected by a nut 39 to a screw 40 carried by a removable cap 41 on the rear end of the tube 34. The rear end of the chain 31 is connected to hook 42 on the forward end of the spring, and the forward end of the chain is connected to a hook or lug 43 provided on the forward end of the guide 32.

The front wall 13 of the oven is provided with an opening 45 for accommodating the guide 32 and the arm 35. The box 33 is formed of a sheet metal blank bent to the form shown. It is generally rectangular and narrow in cross section and one side wall is provided at its forward edge with a laterally extending flange 46 abutting against the rear face of the front panel 13 and secured thereto by means of screws 47.

The operation of the counterbalancing arrangement will be readily understood in the foregoing description taken in connection with the accompanying drawings. It is clear that, when the door is swung from the vertical closed position shown in Fig. 1 to the horizontal open position shown in Fig. 2, the spring is gradually extended thereby placing it under increased tension at a rate corresponding generally to the increasing force of gravity tending to swing the door downwardly. During this operation, successive portions of the chain are laid upon the forwardly moving guide 32 so that the spring has a straight line action generally tangential to the circular line of movement of the guide. When the door is brought to full open position, the tooth 36 engages against the stop 37 so that the door is held in that position. When the door is swung to closed position, the tension of the spring gradually decreases. In the operations of opening and closing the door, kinking of the flexible connecting member 31 is prevented. The counterbalancing arrangement is relatively compact and is so constructed that it may be placed between the side walls of the shells without increasing the size of such space or the size of the oven. Heretofore, lack of space directly to the rear and below the pivot point has, for the most part, precluded satisfactory hinging of this type of door. With the present arrangement, this problem is effectively solved. The spring is anchored at its rear end to the tube 34 so that the tube and box 33 not only prevent the insulation between the side walls from interfering with the proper operation of the counterbalance, but also serve to hold the rear end of the spring in spaced relation to the front panel of the oven. The force exerted by the spring is communicated through the tube and box against the front panel 13 and, since the spring is not connected to the rear wall of the outer shell, this wall may be made relatively light.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a frame having a door opening, a door pivoted at its lower edge to said frame for swinging movement from a vertical closed position to a horizontal open position, a guide carried by said door and extending rearwardly therefrom and having an arcuate surface curved generally about the pivotal axis of the door, a coiled tension spring arranged in substantial tangential relation to said curved surface of the guide, means for anchoring the rear end of the spring, a flexible connecting member having its opposite ends respectively connected to the forward ends of said guide and spring and arranged to be progressively laid onto said curved surface as the door is swung from closed position to open position, the portions of said member extending between the curved surface of the guide member and the spring being in alignment with the spring in all positions of the door, and a stop forming an engagement between the frame and the end of said guide for limiting the opening movement of the door to a horizontal position.

2. In combination, a casing having a door opening, a door, means for hinging said door at its lower edge on a horizontal axis for swinging movement from a vertical closed position to a horizontal open position, a curved arm connected to a side edge of said door and projecting from the inner face of the door and over the pivotal axis of the door, a curved guide on and extending laterally from said arm and having an arcuate groove curved about the pivotal axis of the door, a coiled tension spring generally tangential to said guide and anchored at its rear end, and a flexible connection having its opposite ends respectively connected to the forward ends of said guide and spring and arranged to be progressively laid in said groove in partially concealed position when the door is swung from closed position to open position.

3. In combination, a frame having a door opening, a door pivoted at its lower edge to the bottom of the frame for swinging movement from a vertical closed position to a horizontal open position, a coil spring disposed substantially horizontally above the pivotal axis of the door and adjacent a vertical side edge of the door and at right angles to the plane of the door when the door is in closed position, an arcuate guide member on the door having a curved surface constructed and arranged to be disposed substantially tangentially to the axis of the spring at any pivoted position of the door, and flexible connecting means extending between the spring and the forward end of said guide member and arranged to be progressively laid onto said curved surface as the door is swung from closed position to open position with the remainder of said connecting means extending in a substantially straight horizontal line between the said curved surface and the spring.

4. In combination, a frame having a door opening, a door pivoted at its lower edge to the bottom of the frame for swinging movement from a vertical closed position to a horizontal open position, a coil spring disposed substantially horizontally above the pivotal axis of the door and adjacent a vertical side edge of the door and at right angles to the plane of the door when the door is in closed position, an arcuate guide member on the door having a curved surface constructed and arranged to be disposed substantially tangentially to the axis of the spring at any pivoted position of the door, and flexible connecting means extending between the spring and the forward end of said guide member and arranged to be progressively laid onto said curved surface as the door is swung from closed position to open position with the remainder of said connecting means extending in a substantially straight horizontal line between the said curved surface and the spring, said guide member being provided with a groove for preventing lateral movement of and partially concealing the flexible member when the door is moved to open position.

5. In combination, a frame having a door opening, a door pivoted at its lower edge to the bottom of the frame for swinging movement from a vertical closed position to a horizontal open position, a coil spring disposed above the pivotal axis of the door and adjacent a vertical side edge of the door and at an angle to the plane of the door when the door is in closed position, an arcuate guide member on the door having a curved surface constructed and arranged to be disposed substantially tangentially to the axis of the spring at any pivoted position of the door, and flexible connecting means extending between the spring and the forward end of said guide member and arranged to be progressively laid onto said curved surface as the door is swung from closed position to open position with the remainder of said connecting means extending in a substantially straight horizontal line between the said curved surface and the spring.

NILS T. ALMQUIST.

REFERENCES CITED

The following references are of record in the file of this patent:

UNITED STATES PATENTS

| Number | Name | Date |
| --- | --- | --- |
| Re. 17,917 | Boylan | Jan. 6, 1931 |
| 801,694 | Sheppard | Oct. 10, 1905 |
| 955,653 | Merriman | Apr. 19, 1910 |
| 1,085,422 | Hills | Jan. 27, 1914 |
| 1,444,153 | Harter | Feb. 6, 1923 |
| 1,640,250 | Possons | Aug. 23, 1927 |
| 1,678,855 | Forshee | July 31, 1928 |
| 1,759,696 | Hearl | May 20, 1930 |
| 1,922,587 | Hoffstetter et al. | Aug. 15, 1933 |
| 1,954,182 | Rasmussen | Apr. 10, 1934 |
| 1,963,388 | Smith | June 19, 1934 |
| 2,129,750 | Schneider | Sept. 13, 1938 |